(No Model.) 2 Sheets—Sheet 2.
A. KÖHL.
BICYCLE LOCK.
No. 604,536. Patented May 24, 1898.
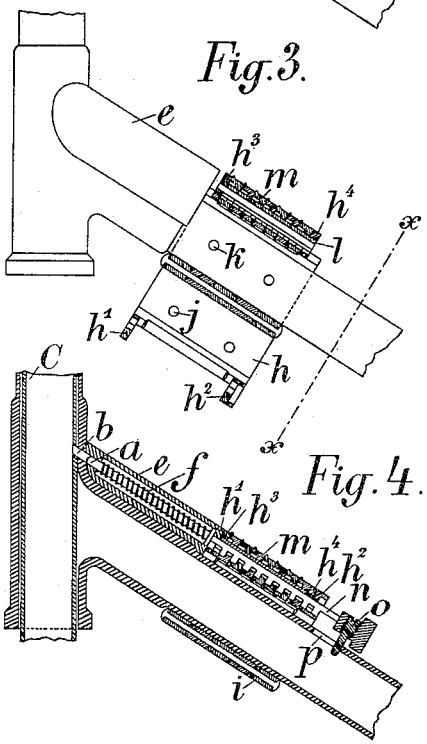

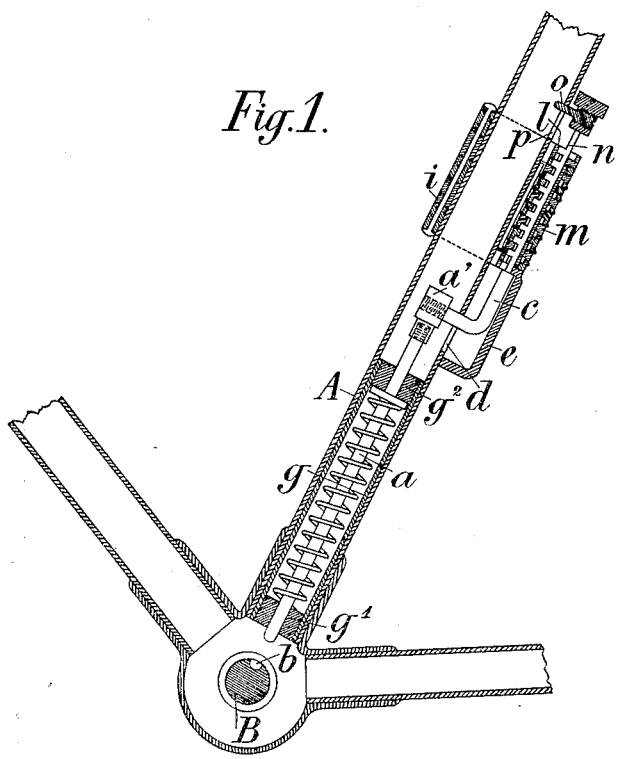

United States Patent Office.

ALEXIS KÖHL, OF COPENHAGEN, DENMARK.

BICYCLE-LOCK.

SPECIFICATION forming part of Letters Patent No. 604,536, dated May 24, 1898.

Application filed August 15, 1896. Serial No. 602,875. (No model.) Patented in England July 24, 1896, No. 16,451.

*To all whom it may concern:*

Be it known that I, ALEXIS KÖHL, engineer, a subject of the King of Denmark, residing at Copenhagen, Denmark, have invented certain new and useful Improvements in Bicycle-Locks, (for which Letters Patent have been obtained in Great Britain, No. 16,451, dated July 24, 1896;) and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has relation to locks for cycles, whereby a movable element of the latter may be locked against motion to prevent the unauthorized use of the vehicle.

In the accompanying drawings, Figure 1 is a sectional view of my improved lock, illustrating its application to a frame member of a cycle and arranged to lock the crank-axle against rotation. Fig. 2 is an elevation illustrating the application of the lock to a frame member of the cycle and adapted to lock the steering bar or tube against motion. Fig. 3 is a sectional view of Fig. 2, showing the lock-strap open. Fig. 4 is a sectional view of Figs. 2 and 3, and Fig. 5 is a section on line $x$ $x$ of Fig. 3.

As shown in the drawings, the lock proper consists of a strap $h$, made in two parts hinged together at $i$, both parts of the strap having at each end of their meeting edges a bearing $h'$ $h^2$ and $h^3$ $h^4$, respectively, provided with a boltway, the bearings on one of the strap-sections being so arranged relatively to those on the other section as to overlap one another when closed together, so that the bolt when introduced into and passed through said bearings will lock the strap-sections together.

The strap-sections are of segmental shape in cross-section and adapted to embrace a frame member of the cycle, and in or between the aforesaid bearings, as those $h^3$ $h^4$ of one of the strap-sections, is arranged a longitudinally-slotted carrier-tube $l$ for the ring-tumblers $m$ of a well-known construction of permutation-lock, seven such tumblers being shown, each provided on its periphery with a plurality of indices, (letters or numerals, as from "0" to "9,") as is customary. The tumblers are each constructed with an inwardly-projecting circular flange, in each of which is formed a notch for the passage of the warts or teeth on the lock-bolt $n$, so that when the tumblers are all set to a given numeral there will be a clear passage for the insertion or removal of said bolt. The number of warts or teeth on the bolt $n$ are of course equal to the number of tumblers $m$, and when the latter are set, the bolt inserted and then turned to move the notches out of register with the warts on the bolt the latter will be locked against endwise motion in a well-known manner. The warts or teeth on the bolt are of course of such a length as to project through the slot in the carrier-tube $l$ into the tumblers.

In practice I make the bolt $n$ considerably longer than the lock, so as to adapt it, if desired, to directly engage a movable element of a cycle, and as the carrier-tube is not fixed to or is removably connected with one of the sections of the two-part strap the said tube can readily be removed for varying the relative arrangement of the tumblers thereon, while said carrier-tube, when inserted loosely between the bearings $h^3$ $h^4$ of the strap, can be locked thereto by the bolt itself, and to prevent said bolt from being completely withdrawn I provide means for limiting its endwise motion in the lock, as will appear hereinafter.

A lock constructed as described may of course be applied to a cycle so as to lock any of the movable elements thereof, and to prevent the removal of the lock it is so secured to a frame member of the cycle as to require the opening of the lock before its removal is possible. To this end one of the sections of the strap $h$ may, for instance, be provided with locking-studs $j$, adapted to project into sockets or holes $k$ in the frame member to which the lock is applied.

In Fig. 1 I have shown the lock applied to the saddle-standard A of a cycle and arranged to lock the crank-axle B against rotation, said axle having one or more recesses $b$ in its periphery, adapted to receive the end of an auxiliary locking-bolt $a$, that is guided in its movements in suitable bearings $g'$ $g^2$ within the standard and is normally held out of engagement with the crank-axle by a retracting-spring $f$, exerting its power on the lower bearing $g'$ and on a circular abutment on the auxiliary bolt, as shown. The upper end of the bolt has secured thereto by means of a sleeve $a'$ a bent arm $c$, that projects through a longitudinal slot $d'$ in the saddle-standard, the vertical or longer portion of the arm lying in contact with the lock-bolt $n$, whose endwise motion in the lock is limited by a stud $o$, screwed to the bolt-head and projecting into the saddle-standard through a longitudinal slot $p$ therein.

The operation of the lock will be readily understood by a mere glance at the drawings by those familiar with the operation of permutation-locks, while the crank-axle B is locked by first properly setting the lock-tumblers to admit of endwise movement of the bolt $n$, which can then be pressed inwardly, thereby forcing the auxiliary bolt $a$ into engagement with the notch $b$ or one of the notches, if there are several, in the crank-shaft B, and can be locked in this position by merely displacing one or more of the tumblers $m$.

In order to protect the arm $c$ on the auxiliary bolt $a$ and prevent the removal of said arm from said bolt, I provide the strap-section that carries the lock with a casing $e$, of segmental form in cross-section, adapted to completely inclose said arm, as shown.

Of course it is obvious that the arm $c$ instead of being rigidly connected with the auxiliary bolt $a$ may be so connected with the main or lock bolt $n$ and simply impinge upon the auxiliary bolt, or said arm may be rigidly connected with both the main and auxiliary bolts, thus virtually forming a single lock-bolt, in which case the spring $f$ can be dispensed with.

In Figs. 2, 3, and 4 I have shown my improved lock device in a position to lock the steering-tube C against rotation, and in this arrangement a spring-retracted auxiliary bolt $a$ is also shown in line with the main bolt $n$; but here also a single lock-bolt may be used and the retracting-spring $f$ dispensed with.

If desired, the steering-tube C may be provided with a number of holes to be engaged by the lock-bolt or auxiliary bolt, as the case may be, and said holes may be so located as to lock the steering-tube in a position in which the steering-wheel axis will lie in a plane at a greater or less angle to the axis of the main wheel, thus also preventing the unauthorized use of the vehicle.

Having thus described my invention, what I claim as new therein, and desire to secure by Letters Patent, is—

1. A cycle-lock comprising a strap adapted to embrace a frame-bar of the cycle, the free ends overlapping, bearings formed therein, and a bolt adapted to lock said ends together and to lock a movable element of the cycle, for the purpose set forth.

2. A cycle-lock comprising two parts hinged together and adapted to embrace a frame member of the cycle, and a bolt adapted to lock said parts together and to lock a movable element of the cycle against motion, for the purpose set forth.

3. The combination with a movable element and a frame member of a cycle, of a lock composed of two parts hinged together and adapted to embrace the frame member, and a bolt adapted to lock said parts to the frame member and to lock the movable element against motion, for the purpose set forth.

4. A bicycle-lock comprising a hinged strap adapted to fit around a frame member of a cycle, a permutation-lock on one of the strap parts, the other provided with lugs or ears having boltways fitting against opposite ends of the lock, and a bolt for said lock extending through and beyond said boltways, for the purpose set forth.

5. The combination with a frame member and a movable element of a cycle, of a permutation-lock and its bolt, said lock constructed to be locked to said frame member by its bolt and the latter adapted to lock the movable element, and a stop connected with the bolt and extending into a slot in the frame member to limit the endwise motion of the bolt, for the purpose set forth.

6. A lock for cycles comprising a substantially cylindrical strap formed of two parts hinged together, a permutation-lock secured to one of the strap parts, the other provided with lugs or ears having a boltway, and with pins projecting from its inner face, and a bolt of a length to project from opposite faces of the lock and adapted to be locked therein against unauthorized removal, said bolt having bearings in the aforesaid ways in the strap-lugs, for the purpose set forth.

7. In a bicycle-lock, a hinged strap surrounding the cycle-frame, pins on said strap engaging holes in the frame, and a lock mechanism on one section of the strap, ears on the other section adapted to register with the said lock mechanism, and a bolt adapted to lock both lock-sections together, pass through the cycle-frame, and engage and lock a moving element, substantially as described.

8. A cycle-lock comprising a strap composed of two parts hinged together, each of said parts provided with two ears having boltways, a permutation-lock detachably secured between the ears of one of said parts, and a bolt projecting through the alined boltways when the strap is closed, for the purpose set forth.

9. A cycle-lock comprising a strap composed of two parts hinged together, each of said parts provided with two ears having boltways, a permutation-lock secured between the ears of one of the strap parts, a bolt for said lock adapted to pass through the alined ways in the ears of both parts when the strap is closed, and a spring-actuated auxiliary bolt
5 adapted to engage a movable element of a cycle, said bolt moved into such engagement by the lock-bolt, substantially as set forth.

In testimony that I claim the foregoing as my invention I have signed my name in presence of two subscribing witnesses.

ALEXIS KOHL.

Witnesses:
  K. HOLTEN,
  L. CHRISTENSEN.